US012705287B2

(12) United States Patent
Xu

(10) Patent No.: US 12,705,287 B2
(45) Date of Patent: Aug. 11, 2026

(54) INFORMATION RECOMMENDATION METHOD AND APPARATUS, COMPUTER DEVICE AND STORAGE MEDIUM

(71) Applicant: Beijing Bytedance Network Technology Co., Ltd., Beijing (CN)

(72) Inventor: Ciqiong Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 75 days.

(21) Appl. No.: 18/728,030

(22) PCT Filed: Mar. 14, 2023

(86) PCT No.: PCT/CN2023/081310
§ 371 (c)(1),
(2) Date: Jul. 10, 2024

(87) PCT Pub. No.: WO2023/185449
PCT Pub. Date: Oct. 5, 2023

(65) Prior Publication Data

US 2025/0094498 A1 Mar. 20, 2025

(30) Foreign Application Priority Data

Mar. 29, 2022 (CN) ......................... 202210316226.7

(51) Int. Cl.
*G06F 16/00* (2019.01)
*G06F 16/9038* (2019.01)

(52) U.S. Cl.
CPC ................................ *G06F 16/9038* (2019.01)

(58) Field of Classification Search
CPC ....................................................... G06F 16/45
See application file for complete search history.

(56) References Cited

U.S. PATENT DOCUMENTS

2016/0140136 A1* 5/2016 Huang .................. G06F 16/583 707/728
2023/0195818 A1* 6/2023 Zhu ....................... G06F 16/954 707/706

FOREIGN PATENT DOCUMENTS

CN 101567010 A 10/2009
CN 103729359 A 4/2014
(Continued)

OTHER PUBLICATIONS

International Search Report for PCT/CN2023/081310, mailed May 24, 2023, 6 pages.
(Continued)

*Primary Examiner* — Ajith Jacob
(74) *Attorney, Agent, or Firm* — Astute IP Law Group

(57) ABSTRACT

The present disclosure provides an information recommendation method and apparatus, a computer device and a storage medium. The method includes: presenting a search page in response to a first search request triggered on a multimedia content present page, wherein the multimedia content includes related information of a commodity dimension; presenting, in a preset area of the search page, a recommendation word used for guiding to search for a target attribute of a target object, wherein the target object is an object indicated by the related information, and the recommendation word is generated based on the target object and description information of the target attribute; and in response to a second search request triggered for the recommendation word, acquiring and displaying a search result of the target object under the target attribute.

17 Claims, 7 Drawing Sheets

(56) References Cited

FOREIGN PATENT DOCUMENTS

| | | | |
|---|---|---|---|
| CN | 111611492 | A | 9/2020 |
| CN | 113111286 | A | 7/2021 |
| CN | 113536136 | A | 10/2021 |
| CN | 113779408 | A | 12/2021 |
| CN | 114168843 | A | 3/2022 |
| CN | 114168865 | A | 3/2022 |
| CN | 114168866 | A | 3/2022 |
| CN | 114780832 | A | 7/2022 |
| JP | 2021140716 | A | 9/2021 |

OTHER PUBLICATIONS

First Office Action for Chinese Patent Application No. 202210316226.7, mailed on Mar. 1, 2025, 23 pages.

36 KR, "Markable Aims to Bridge Content Platforms and E-Commerce with Video Search Technology", Baidu.com, Available online at <https://baijiahao.baidu.com/s?id=1615284834567314917&wfr=spider&for=pc>, Oct. 25, 2018, 4 pages (2 pages of English Translation and 2 pages of Original Document).

Office Action received for Chinese Patent Application No. 202210316226.7, mailed on Aug. 2, 2025, 23 pages (12 pages of English Translation and 11 pages of Original Document).

* cited by examiner

INFORMATION RECOMMENDATION METHOD AND APPARATUS, COMPUTER DEVICE AND STORAGE MEDIUM

CROSS-REFERENCE TO RELATED APPLICATION(S)

This application is a U.S. National Stage Application of PCT Application Serial No. PCT/CN2023/081310, filed Mar. 14, 2023, which claims priority to Chinese Application No. 202210316226.7, filed on the China Patent Office on Mar. 29, 2022, and entitled "Information Recommendation Method and Apparatus, Computer Device and Storage Medium", the disclosures of which are incorporated herein by reference in their entireties.

FIELD

The present disclosure relates to the technical field of the Internet, and in particular to an information recommendation method and apparatus, and a computer device and a storage medium.

BACKGROUND

When a user browses a certain piece of multimedia content, if the user wants to further understand detailed information of a related article involved in the multimedia content, the user needs to actively initiate a search according to the information to be learned about.

However, due to the limited understanding of the related article involved in the multimedia content, the user is generally unclear what search information should be used to search for an expected related result, such that the user needs to attempt to use different search information and perform multiple times of search, accordingly the search time consumption is longer, and a final target achievement rate is still lower.

SUMMARY

Embodiments of the present disclosure provide at least an information recommendation method and apparatus, a computer device and a storage medium.

In a first aspect, an embodiment of the present disclosure provides an information recommendation method, including: presenting a search page in response to a first search request triggered on a multimedia content present page, wherein the multimedia content includes related information of a commodity dimension; presenting, in a preset area of the search page, a recommendation word used for guiding to search for a target attribute of a target object, wherein the target object is an object indicated by the related information, and the recommendation word is generated based on the target object and description information of the target attribute; and in response to a second search request triggered for the recommendation word, acquiring and displaying a search result of the target object under the target attribute.

In an optional implementation, the multimedia content includes at least one of a video, a picture, an audio or a text.

In a case where the multimedia content includes a video, the related information of the commodity dimension includes at least one of commodity information presented in the video, commodity information corresponding to a commodity link presented in the video, and commodity information corresponding to a commodity object displayed in a video frame of the video.

In a case where the multimedia content includes a picture, the related information of the commodity dimension includes at least one of commodity information presented in the picture, commodity information corresponding to a commodity link presented in the picture, and commodity information corresponding to a commodity object displayed in the picture.

In a case where the multimedia content includes an audio, the related information of the commodity dimension includes commodity information contained in content played by the audio.

In a case where the multimedia content includes a text, the related information of the commodity dimension includes commodity information contained in the text.

In an optional implementation, the target attribute includes an evaluation attribute, the recommendation word includes a first recommendation word, and the first recommendation word is generated based on the target object and description information of the evaluation attribute.

In an optional implementation, the target attribute includes a channel attribute, the recommendation word includes a second recommendation word, and the second recommendation word is generated based on the target object and description information of the channel attribute.

In an optional implementation, the target attribute includes an evaluation attribute and a channel attribute, the recommendation word includes a first recommendation word and a second recommendation word, the first recommendation word is generated based on the target object and description information of the evaluation attribute, and the second recommendation word is generated based on the target object and description information of the channel attribute.

In an optional implementation, in a case where there are a plurality of first recommendation words, the plurality of first recommendation words are generated based on the target object and description information of a plurality of evaluation dimensions under the evaluation attribute.

In a case where there are a plurality of second recommendation words, the plurality of second recommendation words are generated based on the target object and description information of a plurality of channels under the channel attribute.

In an optional implementation, displaying the search result of the target object under the target attribute, includes: presenting at least one classification dimension of the target object, and presenting at least one media content preview card under each classification dimension, wherein each media content preview card corresponds to one piece of dimension information under the classification dimension.

In a case where the second search request corresponds to the first recommendation word, evaluation information of the target object under the dimension information is presented in the media content preview card; and in a case where the second search request corresponds to the second recommendation word, purchase information of the target object under the dimension information is further presented in the media content preview card.

In an optional implementation, the media content preview card includes a preview content area and a commodity information area for the target attribute.

Preview content for introducing the target object is presented in the preview content area; the preview content includes one of video preview content, live-streaming room preview content or picture preview content.

The evaluation information or the purchase information is presented in the commodity information area for the target attribute; and the purchase information includes purchase link information.

In an optional implementation, displaying the search result of the target object under the target attribute, includes: overlaying and presenting a plurality of media content preview cards contained in the search result, wherein the overlaid and presented media content preview cards overlap with each other, and each media content preview card other than the media content preview card on an uppermost layer respectively presents a part of content.

In response to a sliding operation acting on the overlaid and presented media content preview cards, placing a next media content preview card on the uppermost layer for present.

In a second aspect, an embodiment of the present disclosure further provides an information recommendation apparatus, including: a first presenting module, configured to present a search page in response to a first search request triggered on a multimedia content present page, wherein the multimedia content includes related information of a commodity dimension; a second presenting module, configured to present, in a preset area of the search page, a recommendation word used for guiding to search for a target attribute of a target object, wherein the target object is an object indicated by the related information, and the recommendation word is generated based on the target object and description information of the target attribute; and a third presenting module, configured to: in response to a second search request triggered for the recommendation word, acquire and display a search result of the target object under the target attribute.

In an optional implementation, the multimedia content includes at least one of a video, a picture, an audio or a text.

In a case where the multimedia content includes a video, the related information of the commodity dimension includes at least one of commodity information presented in the video, commodity information corresponding to a commodity link presented in the video, and commodity information corresponding to a commodity object displayed in a video frame of the video.

In a case where the multimedia content includes a picture, the related information of the commodity dimension includes at least one of commodity information presented in the picture, commodity information corresponding to a commodity link presented in the picture, and commodity information corresponding to a commodity object displayed in the picture.

In a case where the multimedia content includes an audio, the related information of the commodity dimension includes commodity information contained in content played by the audio.

In a case where the multimedia content includes a text, the related information of the commodity dimension includes commodity information contained in the text.

In an optional implementation, the target attribute includes an evaluation attribute, the recommendation word includes a first recommendation word, and the first recommendation word is generated based on the target object and description information of the evaluation attribute; and/or, the target attribute includes a channel attribute, the recommendation word includes a second recommendation word, and the second recommendation word is generated based on the target object and description information of the channel attribute.

In an optional implementation, in a case where there are a plurality of first recommendation words, the plurality of first recommendation words are generated based on the target object and description information of a plurality of evaluation dimensions under the evaluation attribute; and in a case where there are a plurality of second recommendation words, the plurality of second recommendation words are generated based on the target object and description information of a plurality of channels under the channel attribute.

In an optional implementation, the third presenting module is configured to present at least one classification dimension of the target object, and present at least one media content preview card under each classification dimension, wherein each media content preview card corresponds to one piece of dimension information under the classification dimension.

In a case where the second search request corresponds to the first recommendation word, evaluation information of the target object under the dimension information is presented in the media content preview card; and in a case where the second search request corresponds to the second recommendation word, purchase information of the target object under the dimension information is further presented in the media content preview card.

In an optional implementation, the media content preview card includes a preview content area and a commodity information area for the target attribute.

Preview content for introducing the target object is presented in the preview content area; the preview content includes one of video preview content, live-streaming room preview content or picture preview content.

The evaluation information or the purchase information is presented in the commodity information area for the target attribute; and the purchase information includes purchase link information.

In an optional implementation, the third presenting module is configured to overlay and present a plurality of media content preview cards contained in the search result, wherein the overlaid and presented media content preview cards overlap with each other, and each media content preview card other than the media content preview card on an uppermost layer respectively presents a part of content.

In response to a sliding operation acting on the overlaid and presented media content preview cards, place a next media content preview card on the uppermost layer for present.

In a third aspect, an embodiment of the present disclosure further provides a computer device, including a processor, a memory and a bus, wherein the memory stores a machine-readable instruction executable by the processor, when the computer device is running, the processor performs communication with the memory via the bus, and the machine-readable instruction executes, when executed by the processor, the first aspect or the steps of any possible information recommendation method in the first aspect.

In a fourth aspect, an embodiment of the present disclosure further provides a computer-readable storage medium, storing a computer program thereon, wherein the computer program executes, when run by a processor, the first aspect or the steps of any possible information recommendation method in the first aspect.

Regarding effect description of the information recommendation apparatus, the computer device and the storage medium, reference may be made to the description of the foregoing information recommendation method, and thus details are not described herein again.

According to the information recommendation method and apparatus, the computer device and the storage medium provided in the embodiments of the present disclosure, the search page is presented in response to the first search request triggered on the multimedia content present page, the multimedia content including related information of the commodity dimension; the recommendation word used for guiding to search for the target attribute of the target object is presented in the preset area of the search page, the target object being the object indicated by the related information, and the recommendation word being generated based on the target object and the description information of the target attribute; and in response to the second search request triggered for the recommendation word, the search result of the target object under the target attribute is acquired and displayed.

That is, in the embodiments of the present disclosure, the multimedia content is presented on the multimedia content present page, the multimedia content includes the related information of the commodity dimension, the object indicated by the related information is the target object, and the recommendation word can be generated based on the target object and the description information of the target attribute of the target object. In this way, when a search is triggered for the multimedia content, the generated recommendation word may be presented in the preset area of the search page, so that the user selects a target attribute of interest and initiates the search for the target object in time to acquire detailed information about the target object under the target attribute, thereby improving the search efficiency and the search target achievement rate.

In order to make the above objectives, features and advantages of the present disclosure more comprehensible, preferred embodiments are list below and are described in detail below in combination with the drawings.

BRIEF DESCRIPTION OF THE DRAWINGS

To illustrate technical solutions in the embodiments of the present disclosure more clearly, a brief introduction on the drawings which are needed in the embodiments is given below. The drawings herein are incorporated in and constitute a part of the present specification, and these drawings illustrate embodiments conforming to the present disclosure and are used for describing the technical solutions of the present disclosure together with the specification. It should be understood that the following drawings illustrate only some embodiments of the present disclosure, and therefore should not be considered as limiting the scope, and those ordinary skilled in the art may also obtain other related drawings according to these drawings without creative efforts.

DETAILED DESCRIPTION OF EMBODIMENTS

Figure 1:
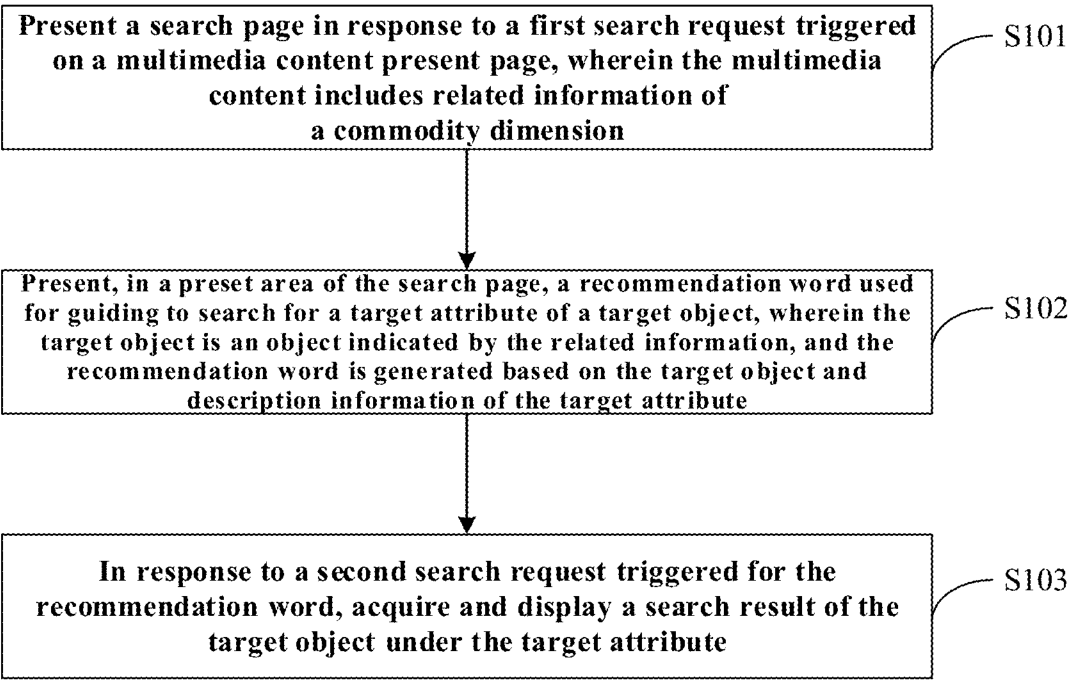
FIG. 1 illustrates a flowchart of an information recommendation method provided in an embodiment of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. Generally, components of the embodiments of the present disclosure described and illustrated in the drawings herein may be arranged and designed in a variety of different configurations. Therefore, the following detailed description of the embodiments of the present disclosure provided in the drawings below are not intended to limit the protection scope of the present disclosure, but merely represents selected embodiments of the present disclosure. All of other embodiments, obtained by those ordinary skilled in the art based on the embodiments of the present disclosure without any creative effort, fall into the protection scope of the present disclosure.

In addition, the terms “first”, “second” and the like in the specification, claims and the above drawings in the embodiments of the present disclosure are used for distinguishing similar objects, and are not necessarily used for describing a specific order or sequence. It should be understood that the data used in this way may be interchanged where appropriate, so that the embodiments described herein can be implemented in an order other than the content illustrated or described herein.

“A plurality of or several” mentioned herein means two or more. “And/or” describes an association relationship between associated objects, and indicates that there may be three relationships, for example, A and/or B may represent three cases, that is, A exists alone, A and B exist simultaneously, and B exists alone. The character “/” generally indicates an “or” relationship between front and back associated objects.

Researches find that during the process of a user browsing multimedia content, the user may be relatively interested in a related article involved in the multimedia content, at this time, if the user wants to learn about detailed information of the related article, the user generally needs to perform a further search via a search engine, and the search is performed on the premise that the user knows what search information is to be used. In a case where content available as search information in the multimedia content is limited or the content is relatively numerous, the user does not know how to refine the search information therefrom, resulting in a problem in which the search time consumption is longer and a final target achievement rate is lower.

The defects existing in the above solutions are results obtained by the inventor after practice and careful researches, therefore the discovery process of the above problems and solutions proposed in the present disclosure below for the above problems should all be contributions of the inventor to the present disclosure during the process of the present disclosure.

Based on this, an embodiment of the present disclosure provides an information recommendation method. Multimedia content presented on a multimedia content present page includes related information of a commodity dimension, an object indicated by the related information is a target object, and a recommendation word may be generated based on the target object and description information of a target attribute of the target object. When the user is interested in the target attribute of the target object involved in the multimedia content and wants to further initiate a search, the user may directly initiate the search based on the recommendation word, and this solution of guiding the user to search for the target object may enable the user to initiate a search for the target object in time, so as to acquire detailed information about the target object under the target attribute, thereby improving the search efficiency and the search target achievement rate.

It should be noted that similar reference signs and letters refer to similar items in the following figures, so once a certain item is defined in one figure, it does not need to be further defined and explained in subsequent figures.

For ease of understanding the present embodiment, firstly, an information recommendation method disclosed in the embodiment of the present disclosure will be described in detail, an execution body of the information recommendation method provided in the embodiment of the present disclosure is generally a computer device having a certain computing capability, and the computer device includes, for example, a terminal device. In some possible implementations, the information recommendation method may be implemented by invoking, by a processor, a computer-readable instruction stored in a memory.

Referring to FIG. 1, it is a flowchart of an information recommendation method provided in an embodiment of the present disclosure, and the method includes S101 to S103.

S101: a search page is presented in response to a first search request triggered on a multimedia content present page, the multimedia content includes related information of a commodity dimension.

In the present step, the multimedia content may include one or more of a video, a picture, an audio, a text (e.g., the text may include an essay, information, and the like), live streaming, and the like. Correspondingly, the multimedia content may be presented in a multimedia present page, and the multimedia present page may include, for example, a web page or an application page in a certain application program, and the like. The multimedia present page may present one or more pieces of multimedia content.

During specific implementation, for the presented multimedia content, information parsing or entity recognition may be performed on the multimedia content to determine whether the multimedia content includes the related information of the commodity dimension, and if so, the following S102 may be executed to generate a recommendation word based on description information of a target attribute associated with the commodity dimension and a target object indicated by the related information.

Herein, the related information of the commodity dimension may include commodity information shown in individual content dimension in the multimedia content, and for different types of multimedia content, the content dimensions for showing the commodity information are different. For example, for a video, the content dimension may include a text content dimension, a video frame dimension (i.e., a commodity object presented in a picture in the video), a commodity link dimension and the like in the video. Similarly, for an image, each content dimension may include a text content dimension in the image, a commodity object dimension presented in the image, a commodity link dimension, and the like, which will be described below in sequence:

In a case where the multimedia content includes a video, the related information of the commodity dimension may include at least one of commodity information presented in the video, commodity information corresponding to a commodity link presented in the video, and commodity information corresponding to a commodity object displayed in a video frame of the video.

Exemplarily, the commodity information presented in the video may include, for example, commodity information indicated by text information shown in a video page, and the text information is, for example, an XX-type facial mask of a brand XX presented in a video title, or information such as a commodity parameter; the commodity link presented in the video may include, for example, information of a commodity mounted on a video widget (e.g., a "shopping cart" widget), including a commodity name or a commodity parameter (e.g., a facial mask effect, or the like); and a commodity object presented on a video frame picture of the video, etc.

As another example, in a case where the multimedia content includes a picture, the related information of the commodity dimension may include at least one of commodity information presented in the picture, commodity information corresponding to a commodity link presented in the picture, and commodity information corresponding to a commodity object displayed in the picture.

Exemplarily, the commodity information presented in the picture may include, for example, text information shown on the picture; the commodity link presented in the picture may include, for example, information of a commodity mounted on a picture widget (e.g., a "shopping cart" widget); and a commodity object presented in the picture, etc.

In a case where the multimedia content includes an audio, the related information of the commodity dimension may include commodity information contained in content played by the audio. Exemplarily, the content played by the audio may be, for example, a described commodity, and may include a commodity name and/or a commodity parameter, etc.

In a case where the multimedia content includes a text, the related information of the commodity dimension includes commodity information contained in the text. Exemplarily, the commodity information contained in the text may be a commodity described in the text, and may include, for example, a commodity name and/or a commodity parameter, etc.

Here, the related information of the commodity dimension is determined, and specifically, semantic recognition may be performed on the text content to determine a commodity object described in the text content.

Figure 2:
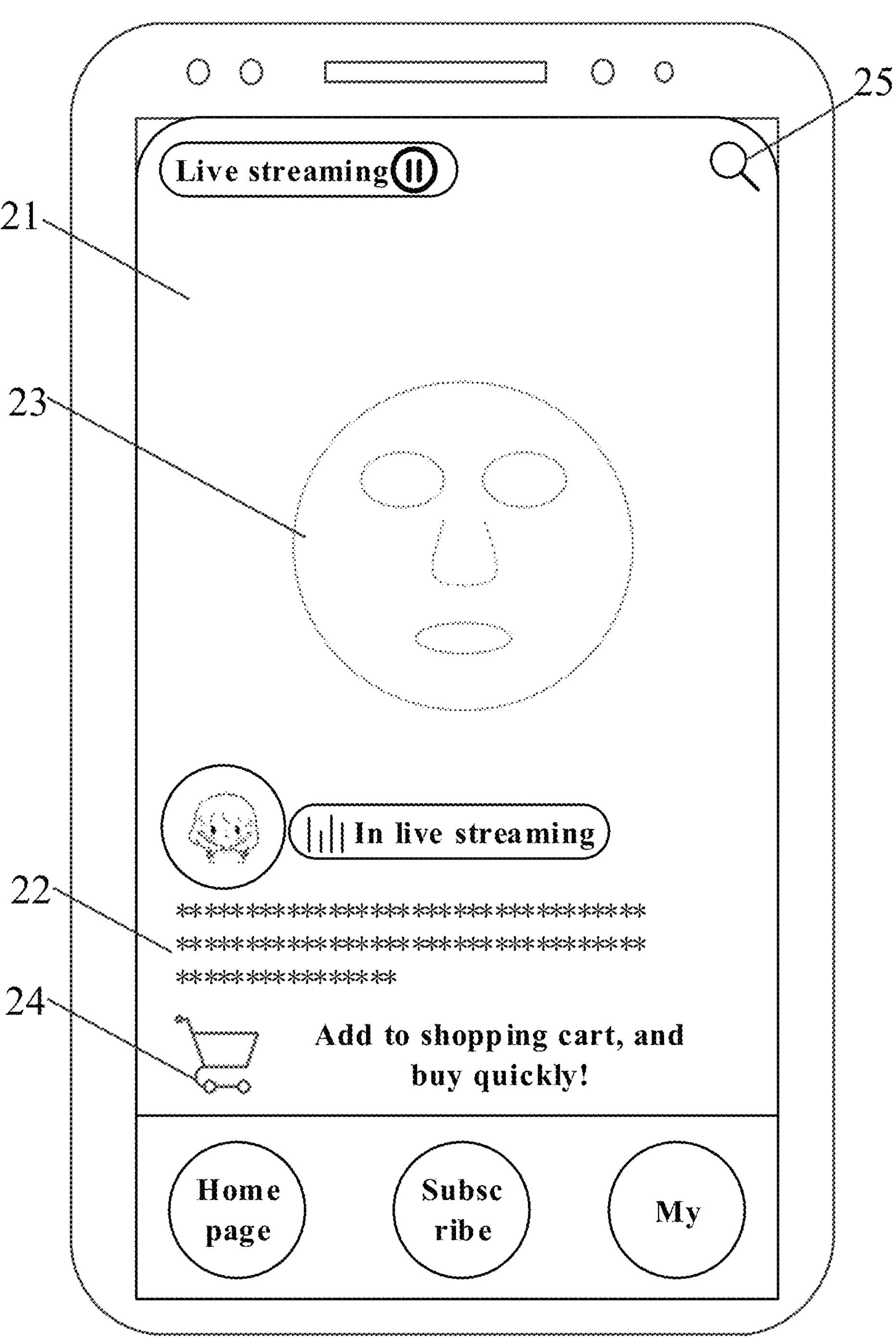
FIG. 2 illustrates a schematic page diagram of a multimedia content present page provided in an embodiment of the present disclosure.

Referring to FIG. 2, FIG. 2 is a schematic page diagram of the multimedia content present page. The multimedia content present page includes currently presented video content 21, commodity information 22 presented in the video, a commodity object 23 (i.e., an illustrated facial mask) presented in a video frame of the video, a commodity link 24 presented in the video, that is, a commodity link 24 presented in the widget form of the "shopping cart".

The above implementation process may be performed before or after responding to the first search request triggered on the multimedia content present page. The trigger operation for the multimedia content present page may be, for example, a trigger operation for any present page position in the multimedia content present page, or may also be a trigger for a specific page position in the multimedia content present page, and the specific page position may be, for example, a search button or a search box 25 presented in the multimedia content present page.

Figure 3:
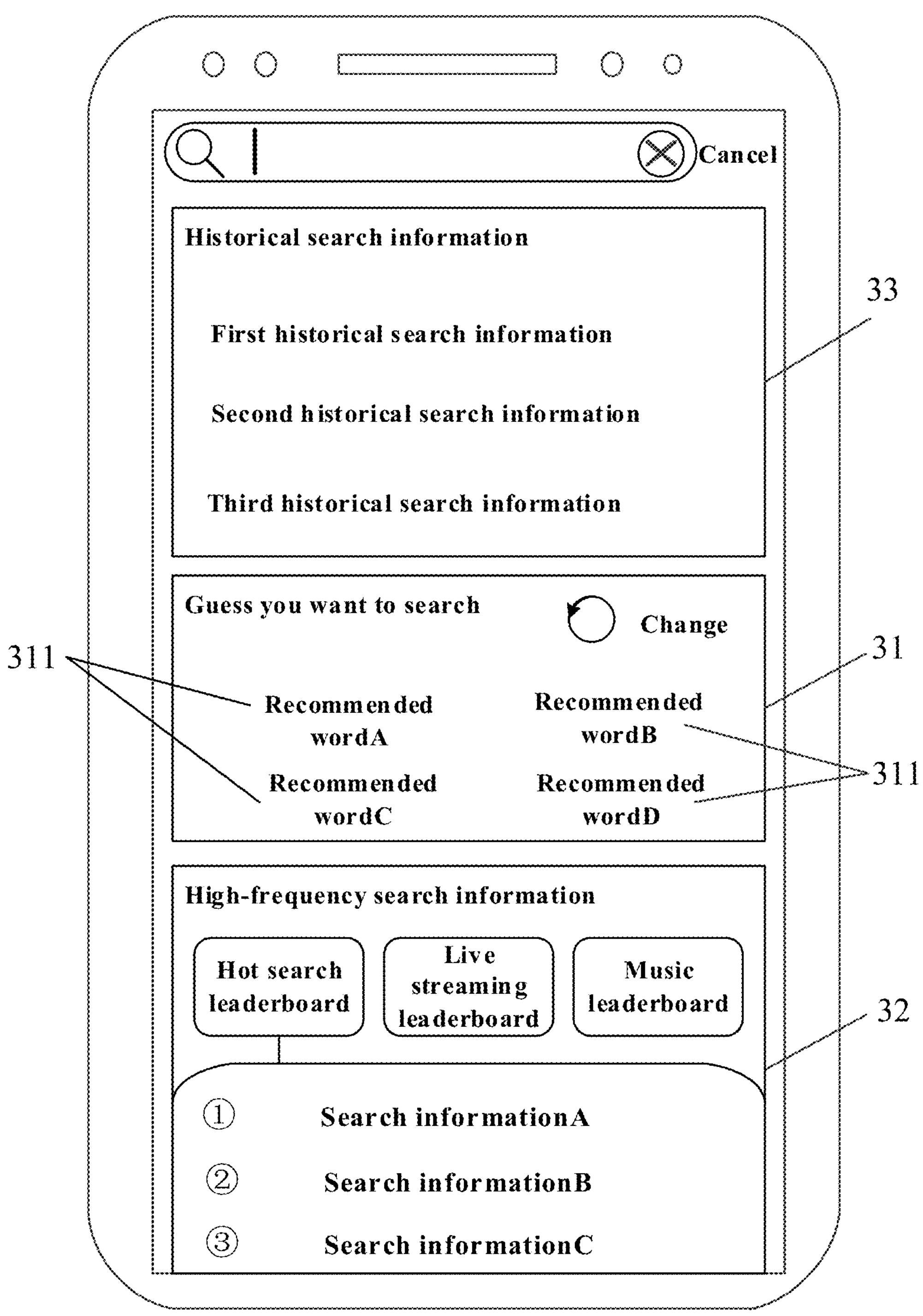
FIG. 3 illustrates a schematic diagram of a search page presented after skipping to a new page provided in an embodiment of the present disclosure.

After receiving the trigger operation, the search page is presented. Specifically, a new page may be skipped to, or a floating layer or a pop-up window may be presented on the multimedia content present page, and the search page is presented by the floating layer or the pop-up window. Referring to FIG. 3, FIG. 3 is a schematic diagram of the search page presented after a new page is skipped to.

S102: a recommendation word used for guiding to search for a target attribute of a target object is presented in a preset area of the search page, the target object is an object indicated by the related information, and the recommendation word is generated based on the target object and description information of the target attribute.

Here, the preset area may be an area after an area for presenting a historical search record in the search page (for example, displayed in a form of guessing you want to search). In the step, based on the target object determined in S101, the recommendation word may be further generated based on the target object and the description information of the target attribute; and then, the recommendation word is presented in the preset area of the search page.

The target object may be the object indicated by the related information, the related information is related information of the commodity dimension, and the target object indicated by the related information may include a commodity object recognized from the multimedia content.

The target attribute may be used for representing recommendation information of the target object in a certain aspect, for example, including evaluation information and purchase channel information, etc.

The recommendation word is generated based on the target object and the description information of the target attribute, specifically, a name of the target object may be determined based on the target object, a keyword of one target attribute may be determined based on the description information of the target attribute, and a spliced word of the name of the target object and the keyword of the target attribute may be used as the recommendation word.

It is taken as an example that the target object is a facial mask of a brand A, the target attribute of the target object may be evaluation for the facial mask of the brand A, the description information of the target attribute may be, for example, effect evaluation (e.g., water replenishment, moisturizing, whitening, and the like) under various types for the facial mask of the brand A, and the keyword of the target attribute may be, for example, evaluation or effect evaluation, then the recommendation word may be facial mask of the brand A+evaluation (or the facial mask of the brand A+effect evaluation), that is, “evaluation of the facial mask of the brand A” (or “effect evaluation of the facial mask of the brand A”).

In one embodiment, the target attribute may include an evaluation attribute and/or a channel attribute. The evaluation attribute is used for representing evaluation of a related organization or user for the target object. For example, the evaluation attribute may include evaluation information, such as quality, performance, price, and the like, of individual brand corresponding to the commodity object. As another example, the evaluation attribute includes evaluation information, such as functions, effects, prices, and the like, under various model numbers or types of the commodity. As another example, the evaluation attribute includes evaluation information, such as quality, performance, prices, and the like, of the commodities manufactured or sold by different suppliers (i.e., merchants). The channel attribute may be used for representing various channels that the user may purchase the target object, for example, live streaming, commodity cards, related videos, etc.

In some embodiments, the recommendation word may include a first recommendation word and/or a second recommendation word. The first recommendation word may be generated based on the target object and the description information of the evaluation attribute. The second recommendation word may be generated based on the target object and the description information of the channel attribute.

For the generation of the first recommendation word, for example, the description information of the target object, such as the name of the target object, may be extracted from the related information of the commodity dimension. In addition, the description information of the evaluation attribute may be a keyword for representing the evaluation attribute, for example, “evaluation”, and may also be a lower-level keyword, for example, an evaluation keyword including an evaluation dimension (e.g., quality, price, aesthetic degree and other dimensions), for example, “quality evaluation”, and may further include a classification dimension+an evaluation dimension. The classification dimension may include, for example, a brand, a model number (or a type), a provider and the like of the target object, and details are described in the following description. Here, the name of the target object and the description information of the evaluation attribute may be spliced to form the first recommendation word.

In a specific implementation, for each classification dimension, the target object may be a commodity object matching a piece of dimension information under the classification dimension. For example, the classification dimension is a brand, and the target object may be a commodity object under a certain specific brand. Alternatively, the brand type of the recognized target object may be not limited, thereof there may be a plurality of brands of the target object at this time.

If the classification dimension includes a brand, the description information of the evaluation attribute of the target object may be evaluation for quality, performance or price under a specific brand. Taking it as an example that the target object is a lipstick, the classification dimension includes a brand, and at this time, the first recommendation word may include, for example, color number evaluation of lipsticks of a brand XX, intended population evaluation of lipsticks of the brand XX, price evaluation of lipsticks of the brand XX, evaluation of lipsticks of the brand XX (including any two or more of color number evaluation, intended population evaluation and price evaluation), etc.

If the classification dimension includes a model number, the description information of the evaluation attribute of the target object may be evaluation for functions, effects or prices under a specific model number. Taking a safe box as an example, safe boxes of different model numbers have different insurance measures, for example, passwords, fingerprints, keys, and the like. A safe box of a model number A has two insurance measures, that is, passwords and keys, a safe box of a model number B has three insurance measures, that is, passwords, fingerprints and keys, at this time, the first recommendation word may include, for example, function evaluation of the safe box of the model number A.

If the classification dimension includes a provider, that is, a merchant, the description information of the evaluation attribute of the target object may be evaluation for prices, logistics and the like of the target object supplied by a specific provider.

For the generation of the second recommendation word, for example, the description information of the target object, for example, the name of the target object, may be extracted from the related information of the commodity dimension. In addition, the description information of the channel attribute may be a keyword for representing a certain channel, for example, "live streaming", the description information of the channel attribute may further include a classification dimension+a specific channel, and the classification dimension may include, for example, a brand, a model number (or a type), a provider and the like of the target object. Here, the name of the target object and the description information of the channel attribute may be spliced to form the second recommendation word.

Exemplarily, if the merchant A is performing live streaming for live streaming information of the target object, the second recommendation word may include a recommendation word for representing that the merchant A is performing live streaming for the target object, for example, "live streaming of the target object of the merchant A".

In some embodiments, in a case where there are a plurality of first recommendation words, the plurality of first recommendation words are generated based on the target object and description information of a plurality of evaluation dimensions under the evaluation attribute. In a case where there are a plurality of second recommendation words, the plurality of second recommendation words are generated based on the target object and description information of a plurality of channels under the channel attribute.

The evaluation dimension may include a quality evaluation dimension, a performance evaluation dimension, a price evaluation dimension, a function evaluation dimension, an effect evaluation dimension and the like under the evaluation attribute. Specifically, each evaluation dimension may correspond to one first recommendation word, or each evaluation dimension may also correspond to a plurality of first recommendation words according to a plurality of classification dimensions.

Exemplarily, the first recommendation word corresponding to the quality evaluation dimension may include the name of the target object+quality evaluation, for example, the first recommendation word is lipstick quality evaluation. In a case where the quality evaluation dimension corresponds to a plurality of first recommendation words, specifically, the first recommendation word may include quality evaluation for at least one of various brands, various model numbers (or types) or various merchants of the target object, for example, color number experience evaluation of a lipstick of a brand A, color number experience evaluation of a lipstick of a brand B, and the like. The first recommendation word corresponding to the performance evaluation dimension may include the name of the target object+performance evaluation, for example, the first recommendation word is an automobile performance evaluation. In a case where the performance evaluation dimension corresponds to a plurality of first recommendation words, specifically, the first recommendation word may include performance evaluation for at least one of various brands, various model numbers (or types) or various merchants of the target object, for example, evaluation of speed per hour performance of an automobile 01 of a branch B, evaluation of the performance of a manufacturing material of the automobile 01 of the branch B, evaluation of the performance of a manufacturing material of an automobile 02 of the branch B. Similarly, the first recommendation word corresponding to the price evaluation dimension may include the name of the target object+price evaluation, for example, the first recommendation word is automobile price evaluation. In a case where the price evaluation dimension corresponds to a plurality of first recommendation words, specifically, the first recommendation word may include price evaluation for at least one of various brands, various model numbers (or types) or various merchants of the target object. Similarly, the manner of determining the first recommendation words corresponding to the function evaluation dimension is similar to the manner of determining the first recommendation words corresponding to the effect evaluation dimension, and thus no examples are listed herein again.

In addition, channels under the channel attribute may include a purchase channel such as live streaming, commodity cards, videos, or the like. Specifically, each channel may correspond to one second recommendation word, and at this time, the second recommendation word may be the name of the target object+the name of the channel, for example, lipstick live streaming and lipstick commodity card. Alternatively, each channel may also correspond to a plurality of second recommendation words according to a plurality of classification dimensions, and at this time, the second recommendation word may be dimension information under the classification dimension+the name of the target object+the name of the channel, for example, live streaming of vehicle AA, more specific examples may refer to the above illustration process of the recommendation words related to the evaluation attribute, and thus details are not described herein again.

The search page may include a plurality of preset areas, for example, as shown in FIG. 3, the search page includes a preset area 31 for presenting the recommended word, a preset area 32 for presenting high-frequency search information, a preset area 33 for presenting historical search information, and the like. The preset area 31 includes at least one recommendation word 311.

S103: In response to a second search request triggered for the recommendation word, a search result of the target object under the target attribute is acquired and displayed.

Here, in a case where the recommendation word includes the first recommendation word, the search result may include a commodity evaluation result, and may specifically include a commodity evaluation search result of at least one evaluation dimension under the evaluation attribute. In a case where the recommendation word includes the second recommendation word, the search result may include a commodity search result of at least one channel.

Figure 4:
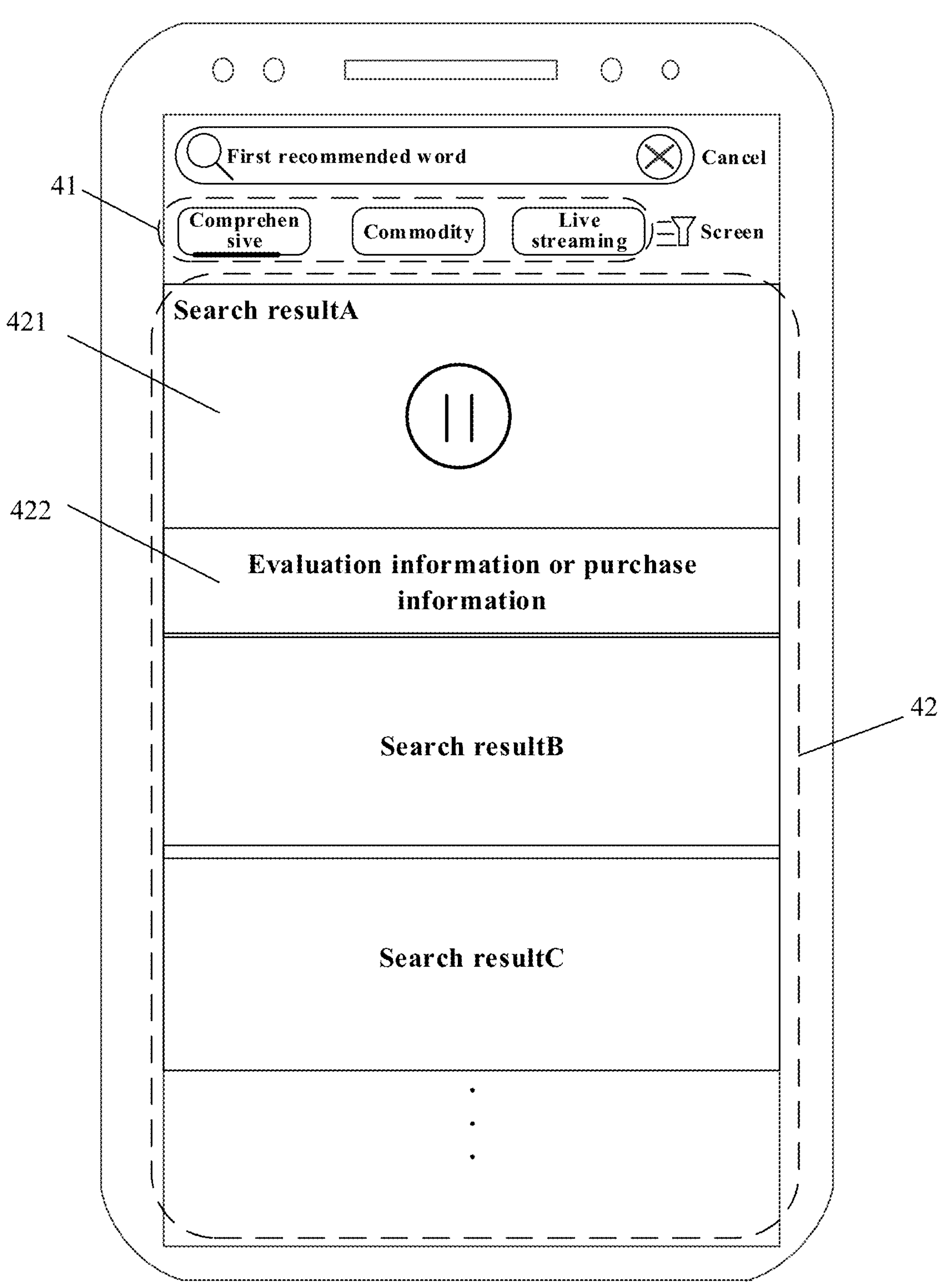
FIG. 4 illustrates a schematic diagram of presenting a search result page provided in an embodiment of the present disclosure.

After the second search request is initiated, the search result of the target object under the target attribute is displayed, as shown in FIG. 4, which is a schematic diagram of presenting a search result page. The search result includes a vertical content class 41 and a search result 42 under a plurality of target attributes.

In the step of displaying the search result of the target object under the target attribute, in some embodiments, at least one classification dimension of the target object may be presented, and at least one multimedia preview card is presented under each classification dimension, each media content preview card corresponds to one piece of dimension information under the classification dimension.

The classification dimension may include a brand, a model number (or type), a merchant and the like of the target object. In a case where there are a plurality of brands of the target object, dimension information under the classification dimension may include, for example, information of a certain specific brand among the plurality of brands. In a case where the target object contains a plurality of model numbers or types, dimension information under the classification dimension may include, for example, information of a certain specific model number or type among the plurality of model numbers or types. In a case where the target object contains a plurality of merchants, dimension information under the classification dimension may include, for example, information of a certain merchant among the plurality of merchants.

The media content preview card may include image-text content, and may specifically include a picture, a video and text content.

In a case where the second search request corresponds to the first recommendation word, evaluation information of the target object under a certain dimension information is presented in the media content preview card. In a case where the second search request corresponds to the second recommendation word, purchase information of the target object under a certain dimension information is presented in the media content preview card.

In a case where the second search request corresponds to the first recommendation word, it is taken as an example that the target object is a lipstick and the dimension information is a brand A, the evaluation information of the target object under the dimension information may include at least one of quality of a lipstick of the brand A, comparison information between a current color number and other red color numbers, an intended population of the current color number, prices, comparison information with lipsticks of the same color number, or other evaluation content.

In a case where the second search request corresponds to the second recommendation word, it is taken as an example that the dimension information is a brand A, the purchase information of the target object under the dimension information may include an introduction (which may include a name, a model number, effects and other information) of a commodity of the brand A to be purchased, a price, a purchase link, and the like.

The media content preview card may include a plurality of areas, and different areas present different information. Specifically, the media content preview card may include a preview content area and a commodity information area for the target attribute, as shown in FIG. 4. The search result 42 is presented in the form of the multimedia content preview card, 421 represents the preview content area, and preview content for introducing the target object is presented in the preview content area 421. The preview content may include one of video preview content, live streaming room preview content, or picture preview content. 422 represents the commodity information area for the target attribute, and evaluation information or purchase information may be presented in the commodity information area 422 for the target attribute. The purchase information may include purchase link information, and the purchase link may be presented in the form of mounting a shopping cart in a video, a text link, and a picture link.

The present form for the search result may be preset, including, but not limited to, present forms such as horizontal arrangement, multi-column arrangement, overlaid presentation, inserted presentation, and the like. Exemplarily, the horizontal arrangement may be that a plurality of multimedia content preview cards are arranged in a horizontal row, that is, arranged in a horizontal extension manner. The multi-column arrangement may be that a plurality of multimedia content preview cards are arranged in a plurality of rows and a plurality of columns, and are arranged in a longitudinal extension manner. The overlaid presentation may be that a plurality of multimedia content preview cards are sequentially overlaid and then are presented. The inserted presentation may be that the multimedia content preview cards are inserted among different multimedia information for present.

In some embodiments, a plurality of media content preview cards contained in the search result are overlaid and presented. The overlaid and presented media content preview cards overlap with each other, and each media content preview card other than the media content preview card on an uppermost layer respectively presents a part of content. In response to a sliding operation acting on the overlaid and presented media content preview cards, a next media content preview card is placed on the uppermost layer for present.

Figure 5:
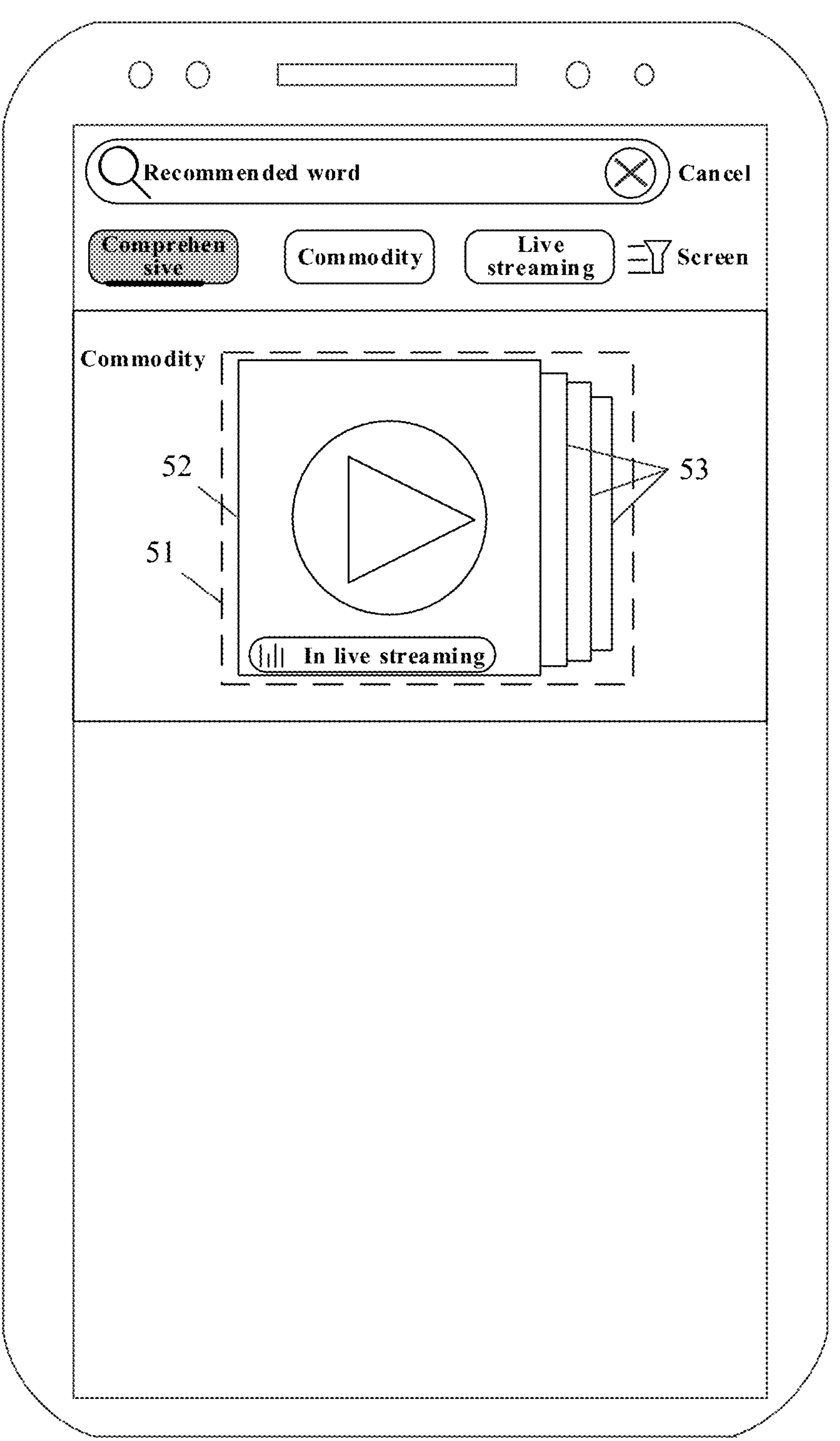
FIG. 5 illustrates a schematic diagram of presenting each media content preview card on a search result page in an overlaid present manner provided in an embodiment of the present disclosure.

Referring to FIG. 5, it is a schematic diagram of presenting each media content preview card on a search result page in an overlaid present manner. 51 represents a plurality of overlaid media content preview cards, 52 represents the media content preview card on the uppermost layer, and 53 represents a media content preview card other than the media content preview card on the uppermost layer among the plurality of overlaid media content preview cards.

An area where the plurality of media content preview cards are overlaid and presented in the search result page is not specifically limited in the embodiments of the present disclosure, for example, may be presented at a first place of the search result page, etc.

For the overlaid and presented media content preview cards, in response to the sliding operation acting on the overlaid and presented media content preview cards, a next media content preview card of the currently presented media content preview card may be acquired in sequence according to the arrangement sequence of the overlaid and presented media content preview cards, and the acquired next media content preview card is placed on the uppermost layer for present.

If it is necessary to return to check a previous media content preview card, in response to a reverse sliding operation acting on the currently presented media content preview card, the previous media content preview card may be presented, and the currently presented media content preview card is covered.

By using S101 to S103, the multimedia content is presented on the multimedia content present page, the multimedia content includes the related information of the commodity dimension, the object indicated by the related information is the target object, and the recommendation word may be generated based on the target object and the description information of the target attribute of the target object. In this way, when a search is triggered for the multimedia content, the generated recommendation word may be presented in the preset area of the search page, so that the user selects a target attribute of interest and initiates the search for the target object in time to acquire detailed information about the target object under the target attribute, thereby improving the search efficiency and the search target achievement rate.

It can be understood by those skilled in the art that, in the above method of specific implementations, the writing sequence of the steps does not imply a strict execution sequence to constitute any limitation on the implementation process, but the specific execution sequence of the steps should be determined by the functions and possible internal logic.

Based on the same inventive concept, an embodiment of the present disclosure further provides an information recommendation apparatus corresponding to the information recommendation method. Since the principle of the apparatus for solving the problem in the embodiments of the present disclosure is similar to that of the information recommendation method in the embodiments of the present disclosure, the implementation of the apparatus may refer to the implementation of the method, and thus details are not described herein again.

Figure 6:
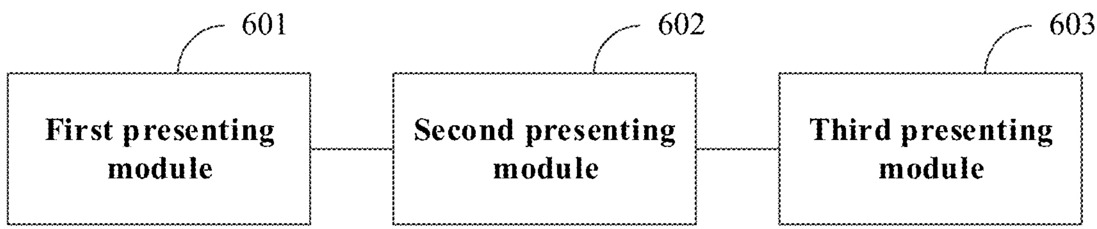
FIG. 6 illustrates a schematic diagram of an information recommendation apparatus provided in an embodiment of the present disclosure.

Referring to FIG. 6, it is a schematic diagram of an information recommendation apparatus provided in an embodiment of the present disclosure, and the apparatus includes a first presenting module 601, a second presenting module 602, and a third second presenting module 603.

The first presenting module 601 is configured to present a search page in response to a first search request triggered on a multimedia content present page, the multimedia content includes related information of a commodity dimension.

The second presenting module 602 is configured to present, in a preset area of the search page, a recommendation word used for guiding to search for a target attribute of a target object, wherein the target object is an object indicated by the related information, and the recommendation word is generated based on the target object and description information of the target attribute.

The third presenting module 603 is configured to: in response to a second search request triggered for the recommendation word, acquire and display a search result of the target object under the target attribute.

In an optional implementation, the multimedia content includes at least one of a video, a picture, an audio or a text.

In a case where the multimedia content includes a video, the related information of the commodity dimension includes at least one of commodity information presented in the video, commodity information corresponding to a commodity link presented in the video, and commodity information corresponding to a commodity object displayed in a video frame of the video.

In a case where the multimedia content includes a picture, the related information of the commodity dimension includes at least one of commodity information presented in the picture, commodity information corresponding to a commodity link presented in the picture, and commodity information corresponding to a commodity object displayed in the picture.

In a case where the multimedia content includes an audio, the related information of the commodity dimension includes commodity information contained in content played by the audio.

In a case where the multimedia content includes a text, the related information of the commodity dimension includes commodity information contained in the text.

In an optional implementation, the target attribute includes an evaluation attribute, the recommendation word includes a first recommendation word, and the first recommendation word is generated based on the target object and description information of the evaluation attribute.

In an optional implementation, the target attribute includes a channel attribute, the recommendation word includes a second recommendation word, and the second recommendation word is generated based on the target object and description information of the channel attribute.

In an optional implementation, target attribute includes an evaluation attribute and a channel attribute, the recommendation word includes a first recommendation word and a second recommendation word, the first recommendation word is generated based on the target object and description information of the evaluation attribute, and the second recommendation word is generated based on the target object and description information of the channel attribute.

In an optional implementation, in a case where there are a plurality of first recommendation words, the plurality of first recommendation words are generated based on the target object and description information of a plurality of evaluation dimensions under the evaluation attribute.

In a case where there are a plurality of second recommendation words, the plurality of second recommendation words are generated based on the target object and description information of a plurality of channels under the channel attribute.

In an optional implementation, the third presenting module 603 is configured to present at least one classification dimension of the target object, and present at least one media content preview card under each classification dimension, each media content preview card corresponds to one piece of dimension information under the classification dimension.

In a case where the second search request corresponds to the first recommendation word, evaluation information of the target object under the dimension information is presented in the media content preview card; and in a case where the second search request corresponds to the second recommendation word, purchase information of the target object under the dimension information is further presented in the media content preview card.

In an optional implementation, the media content preview card includes a preview content area and a commodity information area for the target attribute.

Preview content for introducing the target object is presented in the preview content area; the preview content includes one of video preview content, live-streaming room preview content or picture preview content.

The evaluation information or the purchase information is presented in the commodity information area for the target attribute; and the purchase information includes purchase link information.

In an optional implementation, the third presenting module 603 is configured to overlay and present a plurality of media content preview cards contained in the search result, wherein the overlaid and presented media content preview cards overlap with each other, and each media content preview card other than the media content preview card on an uppermost layer respectively presents a part of content; and in response to a sliding operation acting on the overlaid and presented media content preview cards, place a next media content preview card on the uppermost layer for present.

For the processing flow of each module in the apparatus and the description of the interaction flow between the modules, reference may be made to related descriptions in the foregoing method embodiments, and thus details are not described herein again.

Figure 7:
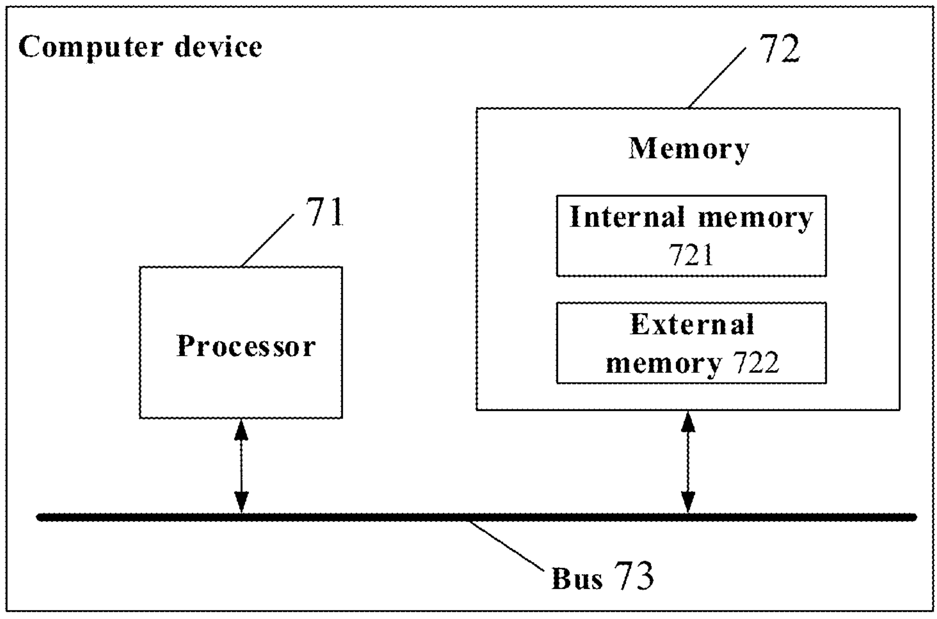
FIG. 7 illustrates a schematic structural diagram of a computer device provided in an embodiment of the present disclosure.

Based on the same technical concept, an embodiment of the present application further provides a computer device. Referring to FIG. 7, it is a schematic structural diagram of a computer device provided in an embodiment of the present application, and the computer device includes: a processor 71, a memory 72 and a bus 73, the memory 72 stores a machine-readable instruction executable by the processor 71, the processor 71 is configured to execute the machine-readable instruction stored in the memory 72, and when the machine-readable instruction is executed by the processor 71, the processor 71 executes the following steps: S101: presenting a search page in response to a first search request triggered on a multimedia content present page, the multimedia content including related information of a commodity dimension; S102: presenting, in a preset area of the search page, a recommendation word used for guiding to search for a target attribute of a target object, the target object being an object indicated by the related information, and the recommendation word being generated based on the target object and description information of the target attribute; and S103: in response to a second search request triggered for the recommendation word, acquiring and displaying a search result of the target object under the target attribute.

The memory 72 includes an internal memory 721 and an external memory 722; the internal memory 721 is also referred to as an internal memory, and is configured to temporarily store operation data in the processor 71 and data exchanged with the external memory 722 such as a hard disk, the processor 71 exchanges data with the external memory 722 via the internal memory 721, and when the computer device is running, the processor 71 performs communication with the memory 72 via the bus 73, so that the processor 71 executes the instructions mentioned in the foregoing method embodiments.

An embodiment of the present disclosure further provides a computer-readable storage medium, storing a computer program thereon, wherein the computer program executes, when run by a processor, the steps of the information recommendation method in the foregoing method embodiments. The storage medium may be a volatile or non-volatile computer-readable storage medium.

An embodiment of the present disclosure further provides a computer program product, including a computer instruction, wherein the computer instruction implements, when executed by a processor, the steps of the foregoing information recommendation method. The computer program product may be any product capable of implementing the foregoing information recommendation method, part or all of solutions in the computer program product, which contribute to the prior art, may be embodied in the form of a software product (e.g., a software development kit (SDK)), and the software product may be stored in a storage medium, and a related device or processor is caused to execute part or all of the steps of the foregoing information recommendation method via a computer instruction contained therein.

Those skilled in the art to which the present disclosure belongs may clearly understand that, for the convenience and conciseness of description, regarding specific working processes of the apparatus described above, reference may be made to corresponding processes in the foregoing method embodiments, and thus details are not described herein again. In several embodiments provided in the present disclosure, it should be understood that, the disclosed apparatus and method may be implemented in other manners. The apparatus embodiments described above are merely exemplary, for example, the division of the modules is only a logic function division, there may be other division manners in practical implementations, for example, a plurality of modules or components may be combined, or some features may be omitted or not executed. From another point of view, the displayed or discussed mutual coupling or direct coupling or communication connection may be indirect coupling or communication connection of apparatuses or modules via some communication interfaces, and may be in electrical, mechanical or other forms.

The units described as separate components may be separated physically or not, components displayed as units may be physical units or not, namely, may be located in one place, or may be distributed on a plurality of network units. A part or all of the units may be selected to implement the purposes of the solutions in the present embodiment according to actual demands.

In addition, the functional modules in various embodiments of the present disclosure may be integrated in one processing module, or the modules individually exist physically, or two or more modules are integrated in one module.

If the function is implemented in the form of a software functional module and is sold or used as an independent product, it may be stored in a processor-executable non-volatile computer-readable storage medium. Based on this understanding, the technical solutions of the present disclosure substantially, or the part contributing to the prior art, or part of or all the technical solutions may be embodied in the form of a software product, the computer software product is stored in a storage medium, and includes several instructions for enabling a computer device (which may be a personnel computer, a server, or a network device or the like) to execute all or part of the steps of the method in various embodiments of the present disclosure. The foregoing storage medium includes a variety of media capable of storing program codes, such as a USB disk, a mobile hard disk, a read-only memory (ROM), a random access memory (RAM), a magnetic disk, or an optical disk.

Finally, it should be noted that the embodiments described above are merely specific implementations of the present disclosure, are used for illustrating the technical solutions of the present disclosure, rather than limiting the technical solutions of the present disclosure, and the protection scope of the present disclosure is not limited thereto. Although the present disclosure has been described above in detail with reference to the foregoing embodiments, those ordinary skilled in the art should understand that, any skilled one who is familiar with this art may still make modifications or readily think of variations to technical solutions recorded in the foregoing embodiments, or make equivalent substitutions to a part of technical features within the technical scope disclosed in the present disclosure; and these modifications, variations or substitutions do not make the essence of the corresponding technical solutions depart from the spirit and scope of the technical solutions of the embodiments of the present disclosure, and shall all fall within the protection scope of the present disclosure. Therefore, the protection scope of the present disclosure shall be subject to the protection scope of the claims.

I claim:

1. An information recommendation method, comprising:

presenting a search page in response to a first search request triggered on a multimedia content present page, wherein the multimedia content comprises related information of a commodity dimension;

presenting, in a preset area of the search page, a recommendation word used for guiding to search for a first attribute of a first object, wherein the first object is an object indicated by the related information, and the recommendation word is generated based on the first object and description information of the first attribute; and in response to a second search request triggered for the recommendation word, acquiring and displaying a search result of the first object associated with the first attribute, wherein, the first attribute comprises an evaluation attribute, the recommendation word comprises a first recommendation word, and the first recommendation word is generated based on the first object and description information of the evaluation attribute;

or, the first attribute comprises a channel attribute, the recommendation word comprises a second recommendation word, and the second recommendation word is generated based on the first object and description information of the channel attribute.

2. The method according to claim 1, wherein the multimedia content comprises at least one of a video, a picture, an audio or a text;

in a case where the multimedia content comprises a video, the related information of the commodity dimension comprises at least one of commodity information presented in the video, commodity information corresponding to a commodity link presented in the video, and commodity information corresponding to a commodity object displayed in a video frame of the video;

in a case where the multimedia content comprises a picture, the related information of the commodity dimension comprises at least one of commodity information presented in the picture, commodity information corresponding to a commodity link presented in the picture, and commodity information corresponding to a commodity object displayed in the picture;

in a case where the multimedia content comprises an audio, the related information of the commodity dimension comprises commodity information contained in content played by the audio; and in a case where the multimedia content comprises a text, the related information of the commodity dimension comprises commodity information contained in the text.

3. The method according to claim 1, wherein in a case where there are a plurality of first recommendation words, the plurality of first recommendation words are generated based on the first object and description information of a plurality of evaluation dimensions under the evaluation attribute; and in a case where there are a plurality of second recommendation words, the plurality of second recommendation words are generated based on the first object and description information of a plurality of channels under the channel attribute.

4. The method according to claim 1, wherein displaying the search result of the first object associated with the first attribute, comprises:

presenting at least one classification dimension of the first object, and presenting at least one media content preview card under each classification dimension, wherein each media content preview card corresponds to one piece of dimension information under the classification dimension; and wherein in a case where the second search request corresponds to the first recommendation word, evaluation information of the first object under the dimension information is presented in the media content preview card; and in a case where the second search request corresponds to the second recommendation word, purchase information of the first object under the dimension information is further presented in the media content preview card.

5. The method according to claim 4, wherein the media content preview card comprises a preview content area and a commodity information area for the first attribute;

preview content for introducing the first object is presented in the preview content area; the preview content comprises one of video preview content, live-streaming room preview content or picture preview content; and the evaluation information or the purchase information is presented in the commodity information area for the first attribute; and the purchase information comprises purchase link information.

6. The method according to claim 1, wherein displaying the search result of the first object associated with the first attribute, comprises:

overlaying and presenting a plurality of media content preview cards contained in the search result, wherein the overlaid and presented media content preview cards overlap with each other, and each media content preview card other than the media content preview card on an uppermost layer respectively presents a part of content; and in response to a sliding operation acting on the overlaid and presented media content preview cards, placing a next media content preview card on the uppermost layer for present.

7. A computer device, comprising: a processor, a memory and a bus, wherein the memory stores a machine-readable instruction executable by the processor, when the computer device is running, the processor performs communication with the memory via the bus, and the machine-readable instruction executes, when executed by the processor:

presenting a search page in response to a first search request triggered on a multimedia content present page, wherein the multimedia content comprises related information of a commodity dimension;

presenting, in a preset area of the search page, a recommendation word used for guiding to search for a first attribute of a first object, wherein the first object is an object indicated by the related information, and the recommendation word is generated based on the first object and description information of the first attribute; and in response to a second search request triggered for the recommendation word, acquiring and displaying a search result of the first object associated with the first attribute, wherein, the first attribute comprises an evaluation attribute, the recommendation word comprises a first recommendation word, and the first recommendation word is generated based on the first object and description information of the evaluation attribute;

or, the first attribute comprises a channel attribute, the recommendation word comprises a second recommendation word, and the second recommendation word is generated based on the first object and description information of the channel attribute.

8. The computer device according to claim 7, wherein the multimedia content comprises at least one of a video, a picture, an audio or a text;

in a case where the multimedia content comprises a video, the related information of the commodity dimension comprises at least one of commodity information presented in the video, commodity information corresponding to a commodity link presented in the video, and commodity information corresponding to a commodity object displayed in a video frame of the video;

in a case where the multimedia content comprises a picture, the related information of the commodity dimension comprises at least one of commodity information presented in the picture, commodity information corresponding to a commodity link presented in the picture, and commodity information corresponding to a commodity object displayed in the picture;

in a case where the multimedia content comprises an audio, the related information of the commodity dimension comprises commodity information contained in content played by the audio; and in a case where the multimedia content comprises a text, the related information of the commodity dimension comprises commodity information contained in the text.

9. The computer device according to claim 7, wherein in a case where there are a plurality of first recommendation words, the plurality of first recommendation words are generated based on the first object and description information of a plurality of evaluation dimensions under the evaluation attribute; and in a case where there are a plurality of second recommendation words, the plurality of second recommendation words are generated based on the first object and description information of a plurality of channels under the channel attribute.

10. The computer device according to claim 7, wherein displaying the search result of the first object associated with the first attribute, comprises:

presenting at least one classification dimension of the first object, and presenting at least one media content preview card under each classification dimension, wherein each media content preview card corresponds to one piece of dimension information under the classification dimension; and wherein in a case where the second search request corresponds to the first recommendation word, evaluation information of the first object under the dimension information is presented in the media content preview card; and in a case where the second search request corresponds to the second recommendation word, purchase information of the first object under the dimension information is further presented in the media content preview card.

11. The computer device according to claim 10, wherein the media content preview card comprises a preview content area and a commodity information area for the first attribute;

preview content for introducing the first object is presented in the preview content area; the preview content comprises one of video preview content, live-streaming room preview content or picture preview content; and the evaluation information or the purchase information is presented in the commodity information area for the first attribute; and the purchase information comprises purchase link information.

12. The computer device according to claim 7, wherein displaying the search result of the first object associated with the first attribute, comprises:

overlaying and presenting a plurality of media content preview cards contained in the search result, wherein the overlaid and presented media content preview cards overlap with each other, and each media content preview card other than the media content preview card on an uppermost layer respectively presents a part of content; and in response to a sliding operation acting on the overlaid and presented media content preview cards, placing a next media content preview card on the uppermost layer for present.

13. A non-transitory computer-readable storage medium, storing a computer program thereon, wherein the computer program executes, when run by a processor:

presenting a search page in response to a first search request triggered on a multimedia content present page, wherein the multimedia content comprises related information of a commodity dimension;

presenting, in a preset area of the search page, a recommendation word used for guiding to search for a first attribute of a first object, wherein the first object is an object indicated by the related information, and the recommendation word is generated based on the first object and description information of the first attribute; and in response to a second search request triggered for the recommendation word, acquiring and displaying a search result of the first object associated with the first attribute, wherein, the first attribute comprises an evaluation attribute, the recommendation word comprises a first recommendation word, and the first recommendation word is generated based on the first object and description information of the evaluation attribute;

or, the first attribute comprises a channel attribute, the recommendation word comprises a second recommendation word, and the second recommendation word is generated based on the first object and description information of the channel attribute.

14. The non-transitory computer-readable storage medium according to claim 13, wherein the multimedia content comprises at least one of a video, a picture, an audio or a text;

in a case where the multimedia content comprises a video, the related information of the commodity dimension comprises at least one of commodity information presented in the video, commodity information corresponding to a commodity link presented in the video, and commodity information corresponding to a commodity object displayed in a video frame of the video;

in a case where the multimedia content comprises a picture, the related information of the commodity dimension comprises at least one of commodity information presented in the picture, commodity information corresponding to a commodity link presented in the picture, and commodity information corresponding to a commodity object displayed in the picture;

in a case where the multimedia content comprises an audio, the related information of the commodity dimension comprises commodity information contained in content played by the audio; and in a case where the multimedia content comprises a text, the related information of the commodity dimension comprises commodity information contained in the text.

15. The non-transitory computer-readable storage medium according to claim 13, wherein in a case where there are a plurality of first recommendation words, the plurality of first recommendation words are generated based on the first object and description information of a plurality of evaluation dimensions under the evaluation attribute; and in a case where there are a plurality of second recommendation words, the plurality of second recommendation words are generated based on the first object and description information of a plurality of channels under the channel attribute.

16. The non-transitory computer-readable storage medium according to claim 13, wherein displaying the search result of the first object associated with the first attribute, comprises:

presenting at least one classification dimension of the first object, and presenting at least one media content preview card under each classification dimension, wherein each media content preview card corresponds to one piece of dimension information under the classification dimension; and wherein in a case where the second search request corresponds to the first recommendation word, evaluation information of the first object under the dimension information is presented in the media content preview card; and in a case where the second search request corresponds to the second recommendation word, purchase information of the first object under the dimension information is further presented in the media content preview card.

17. The non-transitory computer-readable storage medium according to claim 16, wherein the media content preview card comprises a preview content area and a commodity information area for the first attribute;

preview content for introducing the first object is presented in the preview content area; the preview content comprises one of video preview content, live-streaming room preview content or picture preview content; and the evaluation information or the purchase information is presented in the commodity information area for the first attribute; and the purchase information comprises purchase link information.

* * * * *